US009229305B2

(12) United States Patent
Kado et al.

(10) Patent No.: US 9,229,305 B2
(45) Date of Patent: Jan. 5, 2016

(54) IMAGE PROJECTION APPARATUS, CONTROL METHOD, AND COMPUTER-READABLE STORAGE MEDIUM

(71) Applicants: Takahiro Kado, Kanagawa (JP);
Nobuhiro Hosoi, Kanagawa (JP);
Yoshio Kubo, Tokyo (JP)

(72) Inventors: Takahiro Kado, Kanagawa (JP);
Nobuhiro Hosoi, Kanagawa (JP);
Yoshio Kubo, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 176 days.

(21) Appl. No.: 14/031,331

(22) Filed: Sep. 19, 2013

(65) Prior Publication Data

US 2014/0104584 A1    Apr. 17, 2014

(30) Foreign Application Priority Data

Oct. 17, 2012 (JP) ................................. 2012-230328

(51) Int. Cl.
*G03B 21/00*    (2006.01)
*G03B 21/20*    (2006.01)
*H04N 9/31*     (2006.01)
*H05B 41/292*   (2006.01)

(52) U.S. Cl.
CPC ............ *G03B 21/206* (2013.01); *H04N 9/3155* (2013.01); *H05B 41/292* (2013.01); *Y02B 20/204* (2013.01)

(58) Field of Classification Search
CPC ........... G03B 21/2033; G03B 21/2053; G02B 19/0014; G02B 19/0066; Y02B 20/204; Y02B 20/206
USPC ........ 353/52, 57, 85; 315/219, 246, 291, 308; 313/594, 620, 623, 641
See application file for complete search history.

(56) References Cited

U.S. PATENT DOCUMENTS

| 6,552,502 B2 * | 4/2003 | Okamoto et al. ............. 315/336 |
| 2002/0135324 A1 | 9/2002 | Fujii et al. |
| 2007/0164687 A1 * | 7/2007 | Watanabe et al. ............. 315/291 |
| 2008/0079913 A1 * | 4/2008 | Inoue ................. G03B 21/2033 353/85 |
| 2011/0043771 A1 * | 2/2011 | Hirao .............................. 353/85 |
| 2012/0002175 A1 * | 1/2012 | Fujiwara ......................... 353/52 |

FOREIGN PATENT DOCUMENTS

| JP | 2004-233584 | 8/2004 |
| JP | 4070420 | 1/2008 |

* cited by examiner

*Primary Examiner* — Sultan Chowdhury
(74) *Attorney, Agent, or Firm* — Oblon, McClelland, Maier & Neustadt, L.L.P.

(57) ABSTRACT

An image projection apparatus includes a light source configured to cause a light-emitting material to emit light by an electric discharge between a pair of electrodes; an image forming unit configured to form an image by modulating intensity of the light emitted from the light source; a receiving unit configured to receive a power-off input that triggers stopping power supply to the image projection apparatus; and an electric-power control unit configured to increase electric power supplied to the electrodes before stopping power supply to the image projection apparatus when the receiving unit receives the power-off input.

15 Claims, 7 Drawing Sheets

IMAGE PROJECTION APPARATUS, CONTROL METHOD, AND COMPUTER-READABLE STORAGE MEDIUM

CROSS-REFERENCE TO RELATED APPLICATION

The present application claims priority to and incorporates by reference the entire contents of Japanese Patent Application No. 2012-230328 filed in Japan on Oct. 17, 2012.

BACKGROUND OF THE INVENTION

1. Field of the Invention

The present invention relates an image projection apparatus, a method for controlling the image projection apparatus, and a computer-readable storage medium.

2. Description of the Related Art

High-pressure mercury-vapor lamps are widely used as light sources for projectors. The high-pressure mercury-vapor lamp causes vaporized mercury (light-emitting material) sealed in an arc tube to emit light by utilizing an arc discharge between a pair of electrodes arranged in the arc tube. When the projector is powered off, the vaporized mercury returns to its liquid state. However, liquid mercury can stick to the pair of electrodes in this process, resulting in undesirable short circuit between the electrodes. This phenomenon, referred to as "mercury bridging", can be a cause of failure of the projector to light up.

Mercury bridging occurs due to the following two properties: 1) liquefied mercury is likely to stick to a low-temperature portion; and 2) because the electrode unit is more prone to temperature change than the inner bulb unit (arc tube), the temperature of the electrode unit is likely to be lower than the temperature of the inner bulb unit after the projector is powered off. In particular, there is correlation between the temperature of the electrodes and lamp power (electric power supplied to the electrodes). Accordingly, when the projector is powered off in a state where the lamp power is low, difference in temperature between the electrodes and the inner bulb unit widens, and probability of occurrence of mercury bridging increases by leaps. There are conventionally-known techniques that lessen the probability of occurrence of mercury bridging by narrowing the temperature difference between the electrodes and the inner bulb unit by applying after-cooling. The after-cooling is, more specifically, continuing cooling the lamp over a predetermined period of time even after the projector is powered off. For example, Japanese Patent No. 4070420 discloses a technique for preventing mercury bridging at power-off of a projector by powering off the projector after maintaining a lamp-power-low state for a predetermined period of time.

However, a cooling fan keeps rotating in the projector that needs the after-cooling even after a user that has completed a projector job powers off the projector to put it away. Therefore, the projector is disadvantageous in the following ways: the user cannot put away the projector immediately; noise of the fan interferes with conversation; and the user can mistake the after-cooling as a failure and make a customer complaint. Although the technique disclosed in Japanese Patent No. 4070420 does not require after-cooling, this technique maintains the lamp power in the low state until the temperature of the inner bulb unit drops to the boiling point of mercury or lower. Accordingly, this technique is disadvantageous in that the projector is not brought to a complete stop immediately after the projector is powered off, and, furthermore, the projector cannot be put away immediately because it takes long time for the temperature of the inner bulb unit to drop to the boiling point of mercury or lower. Thus, the conventional techniques have sacrificed user's convenience.

Therefore, there is a need to provide an image projection apparatus capable of improving user's convenience, and a method for controlling the image projection apparatus.

SUMMARY OF THE INVENTION

It is an object of the present invention to at least partially solve the problems in the conventional technology.

According to an embodiment, there is provided an image projection apparatus that includes a light source configured to cause a light-emitting material to emit light by an electric discharge between a pair of electrodes; an image forming unit configured to form an image by modulating intensity of the light emitted from the light source; a receiving unit configured to receive a power-off input that triggers stopping power supply to the image projection apparatus; and an electric-power control unit configured to increase electric power supplied to the electrodes before stopping power supply to the image projection apparatus when the receiving unit receives the power-off input.

According to another embodiment, there is provided a method for controlling an image projection apparatus that a light source configured to cause a light-emitting material to emit light by an electric discharge between a pair of electrodes, and an image forming unit configured to form an image by modulating intensity of the light emitted from the light source. The method includes receiving a power-off input that triggers stopping power supply to the image projection apparatus; and increasing electric power supplied to the electrodes before stopping power supply to the image projection apparatus when the power-off input is received.

According to still another embodiment, there is provided a non-transitory computer-readable storage medium with an executable program stored thereon and executed by a computer of an image forming apparatus that includes image projection apparatus that a light source configured to cause a light-emitting material to emit light by an electric discharge between a pair of electrodes, and an image forming unit configured to form an image by modulating intensity of the light emitted from the light source. The program instructs the computer to perform: receiving a power-off input that triggers stopping power supply to the image projection apparatus; and increasing electric power supplied to the electrodes before stopping power supply to the image projection apparatus when the power-off input is received.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
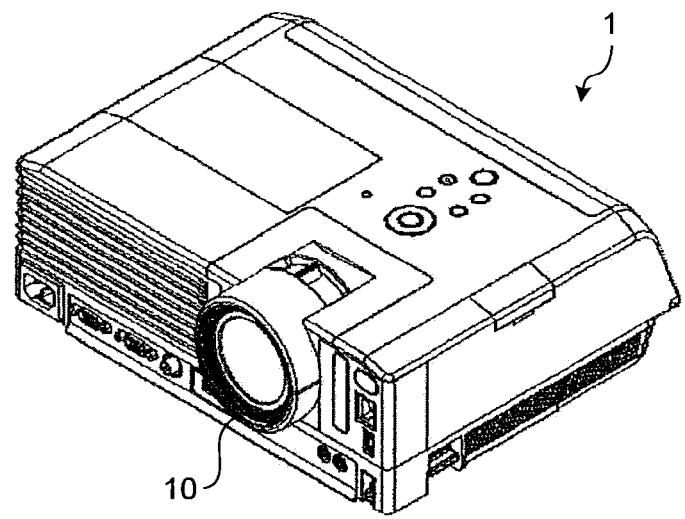
FIG. 1 is a perspective view of a projector according to an embodiment.
Figure 2:
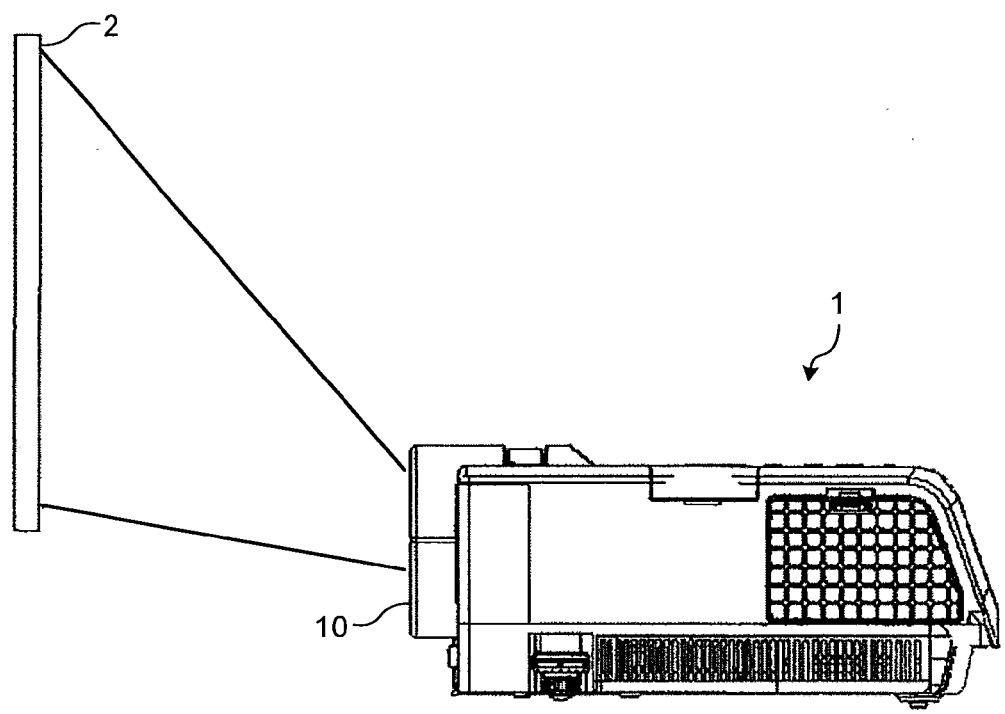
FIG. 2 is a side view of the projector according to the embodiment.

FIG. 1 is a perspective view of a projector 1, which is an example of an image projection apparatus according to an embodiment of the present embodiment. FIG. 2 is a side view of the projector 1. FIG. 2 illustrates a situation where projection light emitted through a projector lens 10 of the projector 1 illuminates a screen 2, which is a projected surface.

Figure 3:
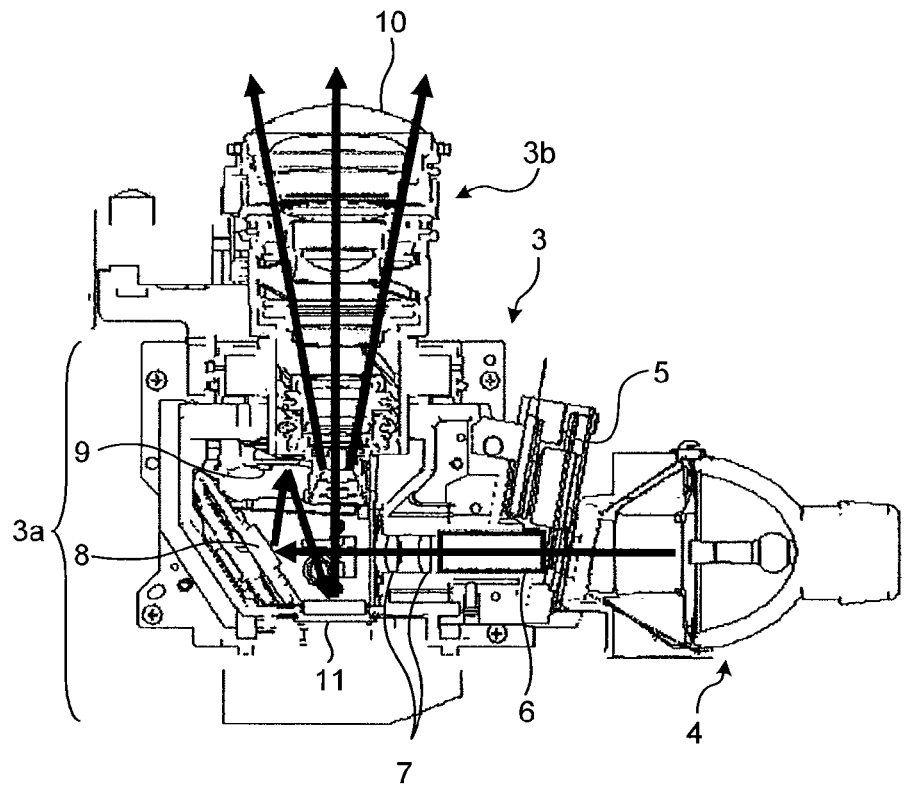
FIG. 3 is an interior cross-sectional view illustrating an optical device and a light source device according to the embodiment.
Figure 4:
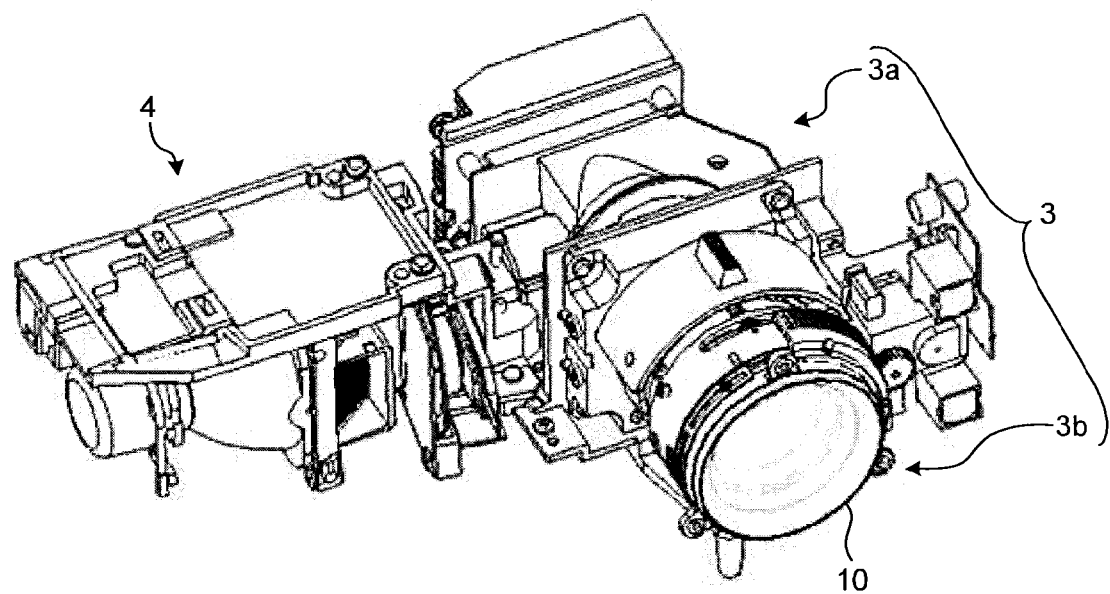
FIG. 4 is a perspective view illustrating the optical device and the light source device according to the embodiment.

FIG. 3 is a cross-sectional view of an optical device 3 and a light source device 4 that are included in the projector 1. FIG. 4 is a perspective view of the optical device 3 and the light source device 4 included in the projector 1.

As illustrated in FIGS. 3 and 4, the optical device 3 includes a lighting mechanism 3a and a projection mechanism 3b. The optical device 3 includes a color wheel 5, a light tunnel 6, a relay lens 7, a plane mirror 8, and a concave mirror 9. The optical device 3 includes an image forming unit 11 that includes a digital micromirror device (DMD).

The disc-like color wheel 5 converts white light from the light source device 4 into light of red (R), green (G), or blue (B), the color of which cyclically changes every unit time. The converted light exits the color wheel 5 toward the light tunnel 6. The light tunnel 6, which is cylindrical and formed by joining plate glasses, guides the light that exits the color wheel 5 to the relay lens 7. The relay lens 7, which is formed by combining two lenses, condenses the light that exits the light tunnel 6 while correcting chromatic aberration on the optical axis. The plane mirror 8 and the concave mirror 9 reflect the light that exits the relay lens 7 to guide and collect the light to the image forming unit 11. The image forming unit 11 includes the DMD that includes a rectangular mirror surface made up of a plurality of micromirrors. The micromirrors are independently driven in a time division manner based on video data or image data, thereby processing and reflecting projection light so that predetermined image data is formed.

The light source device 4 includes a high-pressure mercury-vapor lamp, which will be described later, as a light source. The light source device 4 emits white light toward the lighting mechanism 3a of the optical device 3. The lighting mechanism 3a decomposes the white light emitted from the light source device 4 into R, G, and B light, and guides the light exiting the lighting mechanism 3a toward the image forming unit 11. The image forming unit 11 forms an image by modulating intensity of the light exiting from the light source device 4. The projection mechanism 3b projects an enlarged image of the image formed by the image forming unit 11 onto the screen 2. In the present embodiment, the image forming unit 11 includes the DMD, but not limited thereto. Alternatively, the image forming unit 11 may include a liquid crystal light valve, for instance. In short, any type of an image forming unit capable of forming an image by modulating intensity of light emitted from the light source device 4 can be employed as the image forming unit 11.

A light sink is arranged above, which corresponds to the near side of the plane of FIG. 3, the image forming unit 11. The light sink receives unnecessary light, which is light incident on the image forming unit 11 but not used as the projection light. When light enters the image forming unit 11, the DMD works to actuate the plurality of micromirrors in a time division manner based on video data. The micromirrors reflect light for use in projection toward the projector lenses 10, while the micromirrors reflect light to be discarded into the light sink. In the image forming unit 11, the light for use in a projection image is reflected toward the projection mechanism 3b, in which the light is enlarged through the plurality of projector lenses 10. The enlarged video light is projected.

Figure 5:
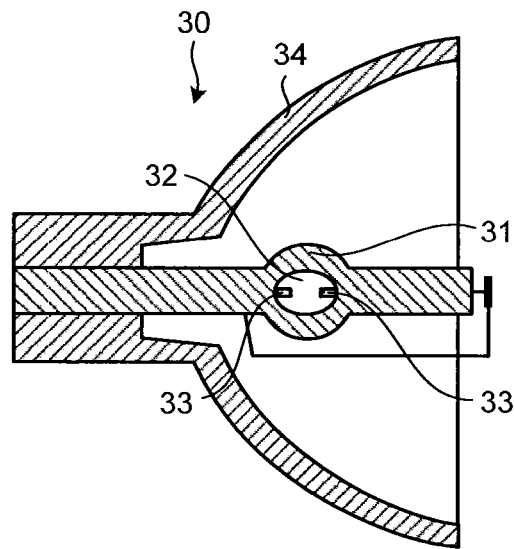
FIG. 5 is a cross-sectional view of a high-pressure mercury-vapor lamp according to the embodiment.

FIG. 5 is a cross-sectional view of a high-pressure mercury-vapor lamp 30 included as the light source in the light source device 4. As illustrated in FIG. 5, the high-pressure mercury-vapor lamp 30 includes an inner bulb unit 31, mercury 32 sealed in the inner bulb unit 31 at a high pressure, a pair of electrodes 33 arranged inside the inner bulb unit 31, and a reflector 34. The high-pressure mercury-vapor lamp 30 functions as the light source by causing the mercury 32 to emit light by utilizing an arc discharge between the pair of electrodes 33.

More specifically, the high-pressure mercury-vapor lamp 30 works as follows. The pair of electrodes 33 is made of, for example, tungsten. When a high voltage is applied across the pair of electrodes 33, an arc discharge is formed. Interaction between the arc discharge and the mercury 32 sealed in the inner bulb unit 31 at the high pressure generates emission spectrum and continuous spectrum; that is, emits light. The light emitted from the inner bulb unit 31 is reflected by the reflector 34 to converge to one point. Not only the mercury 32 but also starting rare gas and other halogen are sealed in the inner bulb unit 31. When mercury bridging, which is connection (short circuit) between the pair of electrodes 33 with liquefied mercury, occurs, a voltage cannot be applied across the pair of electrodes 33 and, accordingly, an arc discharge is not formed. As a result, the lamp 30 fails to light up.

Figure 6:
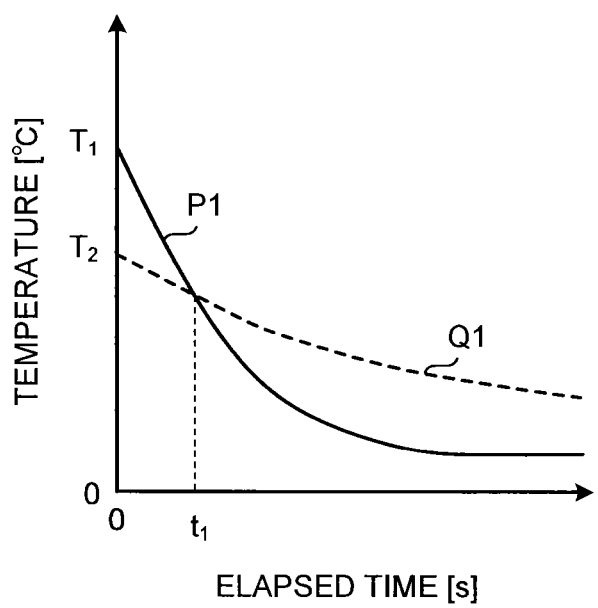
FIG. 6 is a diagram illustrating an example of changes in temperature over time of each of an inner bulb unit and electrodes of a conventional projector.

Here is assumed a conventional projector that uses the high-pressure mercury-vapor lamp 30 described above as a light source. FIG. 6 is a diagram illustrating an example of changes in temperature over time of each of the inner bulb unit 31 and the electrodes 33 in a condition where after-cooling is not applied after powering off the projector (i.e., after stopping power supply to the projector). P1 in FIG. 6 designates changes in temperature over time of the electrodes 33. Q1 in FIG. 6 designates changes in temperature over time of the inner bulb unit 31. As illustrated in FIG. 6, temperature $T_1$ of the electrodes 33 is very high as compared to temperature $T_2$ of the inner bulb unit 31 immediately after power-off (time t=0). However, the temperature of the electrodes 33 drops faster than the temperature of the inner bulb unit 31 does (i.e., the electrodes 33 is lower in specific heat than the inner bulb unit 31). Accordingly, the temperature of the electrodes 33 becomes equal to the temperature of the inner bulb unit 31 at time $t=t_1$ and, since then, the temperature of the inner bulb unit 31 exceeds the temperature of the electrodes 33, and the temperature difference increases with time. If the mercury 32 starts returning to its liquid state at time $t=t_1$ or later, mercury sticking to the electrodes 33 is likely to occur because the temperature of the electrodes 33 is lower than the temperature of the inner bulb unit 31. Accordingly, probability of occurrence of mercury bridging undesirably increases.

Figure 7:
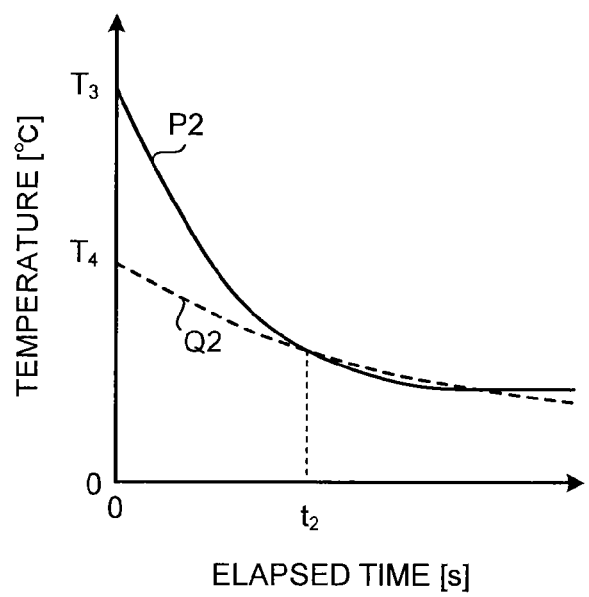
FIG. 7 is a diagram illustrating an example of changes in temperature over time of each of the inner bulb unit and the electrodes of the conventional projector.

FIG. 7 is a diagram illustrating an example of changes in temperature over time of each of the inner bulb unit 31 and the electrodes 33 after powering off the projector (i.e., after stopping power supply to the projector) in a condition where the electric power (lamp power) supplied to the electrodes 33 is higher than that of FIG. 6. P2 in FIG. 7 designates changes in temperature over time of the electrodes 33. Q2 in FIG. 7 designates changes in temperature over time of the inner bulb unit 31. In the example illustrated in FIG. 7, the lamp power immediately before power-off of the projector is higher than that of FIG. 6. Accordingly, $T_3$, which is the temperature of the electrodes 33 immediately after power-off, is higher than $T_4$, which is the temperature of the inner bulb unit 31. Meanwhile, the temperature of the inner bulb unit 31 does not change so greatly as the temperature of the electrodes 33 does. Therefore, the temperature difference $(T_3-T_4)$ between the electrodes 33 and the inner bulb unit 31 immediately after power-off illustrated in FIG. 7 is larger than the temperature difference $(T_1-T_2)$ between the electrodes 33 and the inner bulb unit 31 immediately after power-off illustrated in FIG. 6. Accordingly, as illustrated in FIG. 7, $t_2$, which is time that elapses since immediately after power-off until when the temperature of the electrodes 33 becomes lower than the temperature of the inner bulb unit 31, is longer than $t_1$. A period of time, during which the temperature of the electrodes 33 is lower than the temperature of the inner bulb unit 31, can be reduced as compared with that of FIG. 6. In other words, powering off in a state where the lamp power is high lessens probability of occurrence of mercury bridging.

In consideration of this, according to the present embodiment, control of increasing electric power supplied to the electrodes 33 before powering off is performed when an input that triggers power-off is received. This control allows reducing occurrence of mercury bridging even without applying after-cooling. Meanwhile, for instance, time required to increase the electric power supplied to the electrodes 33 to a predetermined target value (threshold value) (or equivalently, time required to increase the temperature of the electrodes 33 to a predetermined target value) is considerably shorter than time required until the temperature of the inner bulb unit 31 drops to the boiling point of the mercury 32 or lower. Accordingly, the present embodiment allows bringing the projector to a complete stop early as compared with the technique disclosed in Japanese Patent No. 4070420. The present embodiment is described below more specifically.

Figure 8:
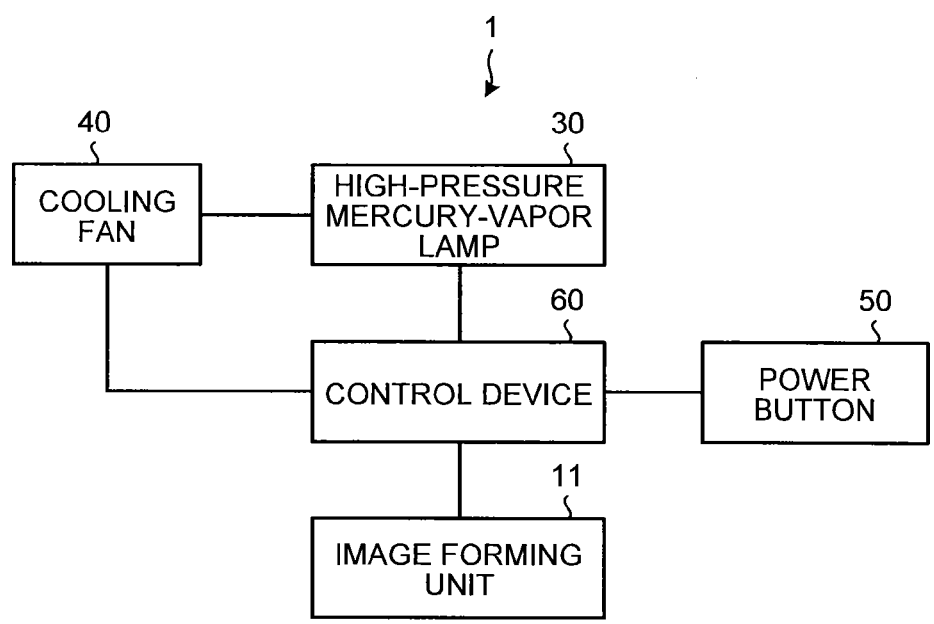
FIG. 8 is a diagram illustrating an example of a hardware configuration of the projector according to the embodiment.

FIG. 8 is a diagram illustrating an example of a minimum hardware configuration of the projector 1 according to the embodiment. As illustrated in FIG. 8, the projector 1 includes the high-pressure mercury-vapor lamp 30, a cooling fan 40, the image forming unit 11, a power button 50, and a control device 60. As described above, the high-pressure mercury-vapor lamp 30 is the light source that utilizes an electric discharge between the pair of electrodes 33 to cause the mercury 32 to emit light. The cooling fan 40 is a fan for cooling the high-pressure mercury-vapor lamp 30 and driven under control of the control device 60. As described above, the image forming unit 11 forms an image by modulating intensity of the light emitted from the high-pressure mercury-vapor lamp 30 (the light source device 4). The projection mechanism 3b (which is not shown in FIG. 8) projects an enlarged image of the image formed by the image forming unit 11 onto the screen 2.

The power button 50 is an operating device for use in designating whether or not to supply electric power to the projector 1. A user that desires to stop power supply to the projector 1 (i.e., to turn the power off) pushes down the power button 50. In the present embodiment, when the power button 50 is pushed down first time (hereinafter, "first push-down of the power button 50"), a notification image that notifies that power supply to the projector 1 is to be stopped is projected onto the screen 2. When the user that has viewed the projected notification image performs second push-down of the power button 50, power supply to the projector 1 is stopped (the power is turned off). This will be described in detail later.

Figure 9:
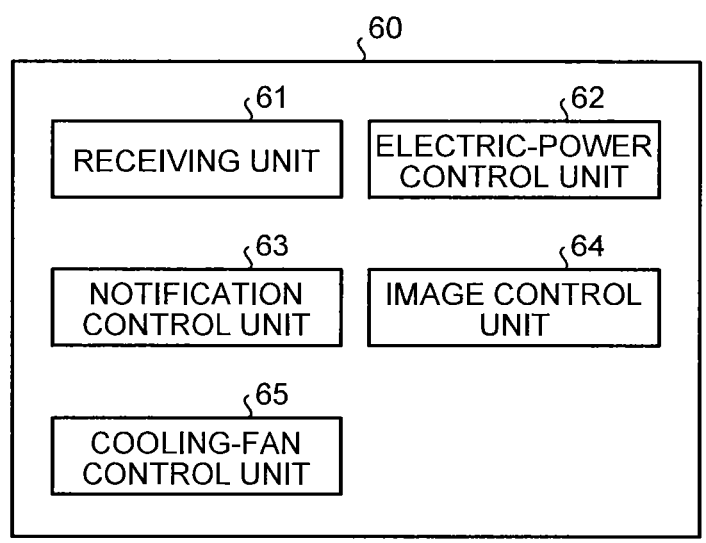
FIG. 9 is a block diagram illustrating an example of a functional configuration of the projector according to the embodiment.

The control device 60 is a device that performs centralized control of operations of the entire projector 1. FIG. 9 is a block diagram illustrating an example of a functional configuration of the control device 60. As illustrated in FIG. 9, the control device 60 includes a receiving unit 61, an electric-power control unit 62, a notification control unit 63, an image control unit 64, and a cooling-fan control unit 65.

The receiving unit 61 receives an input provided by a user. In the present embodiment, the receiving unit 61 receives a power-off input, which refers to an input that triggers stopping power supply to the projector 1. In the present embodiment, the power-off input refers to an input (hereinafter, sometimes referred to as "first input") provided by the first push-down of the power button 50.

The electric-power control unit 62 controls power supply (inclusive of stopping power supply) to the projector 1. In the present embodiment, when the first input is received by the receiving unit 61, the electric-power control unit 62 performs control of increasing a value of electric power supplied to the electrodes 33 before stopping power supply to the projector. In the present embodiment, the electric-power control unit 62 performs control of maintaining the value of the electric power supplied to the electrodes 33 at the threshold value (predetermined target value) when the value of the electric power supplied to the electrodes 33 has reached the threshold value. For instance, if the value of the electric power supplied to the electrodes 33 is equal to or higher than the threshold value at a point in time when the first input is received by the receiving unit 61, the electric-power control unit 62 performs the control of maintaining the value of the electric power supplied to the electrodes 33 at the threshold value.

The electric-power control unit 62 also performs control of stopping power supply to the projector 1 after an input (hereinafter, sometimes referred to as "second input") provided by second or later push-down of the power button 50 is received by the receiving unit 61. In the present embodiment, when the control of increasing the electric power supplied to the electrodes 33 has been started in response to the first input received by the receiving unit 61, the electric-power control unit 62 does not perform the control of stopping power supply to the projector 1 unless a preset period of time elapses even when the second input is received by the receiving unit 61.

The notification control unit 63 performs control of displaying the notification image that notifies that power supply to the projector 1 is to be stopped when the first input is received by the receiving unit 61. More specifically, the notification control unit 63 performs control of displaying a composite image formed by superimposing the notification image on an image that is currently projected onto the screen 2. This composite image is formed by the image forming unit 11 under control of the notification control unit 63. The projection mechanism 3b projects an enlarged image of the composite image formed by the image forming unit 11 onto the screen 2. A user that views the composite image (notification image) projected onto the screen 2 determines whether or not to let the projector 1 be powered off. When the user determines to let the projector 1 be powered off, the user pushes down the power button 50 second time. On the other hand, when the user desires to cancel the power-off or when the push-down of the power button 50 has been performed by mistake, the user waits for the predetermined period of time to elapse or pushes down another button (e.g., a button for changing the image projected on the screen 2 to an immediately-preceding frame) rather than pushing down the power button 50.

When the first input is received by the receiving unit 61, the image control unit 64 performs control of decreasing grayscale values of respective pixels contained in image data, from which the image (in the present embodiment, the composite image described above) that is to be projected onto the screen 2 is formed. As described above, when the first input is received by the receiving unit 61, the electric-power control unit 62 performs the control of increasing the electric power supplied to the electrodes 33. Accordingly, intensity of light emitted from the high-pressure mercury-vapor lamp 30 increases. If the grayscale values of the respective pixels (grayscale values assigned to the respective pixels) that make up the image data, from which the image to be projected onto the screen 2 is formed, remain unchanged, the image projected onto the screen 2 becomes brighter by a degree that depends on the increase in intensity of the light emitted from the high-pressure mercury-vapor lamp 30. As a result, a user that views the image projected onto the screen 2 may feel that the image is glaring. Moreover, a user may find it odd that intensity of the image on the screen 2 increases even though the power is being turned off. This is unfavorable from a viewpoint of user friendliness.

However, in the present embodiment, when the first input is received by the receiving unit 61, the image control unit 64 performs the control of decreasing the grayscale values of the respective pixels contained in the image data, from which the image that is to be projected onto the screen 2 is formed. Accordingly, even when intensity of light emitted from the high-pressure mercury-vapor lamp 30 is increased by the control performed by the electric-power control unit 62, the image projected onto the screen 2 is prevented from increasing in brightness. Therefore, it becomes less likely to occur that a user that views the image projected onto the screen 2 feels that the image is glaring. Furthermore, the user will not feel odd. Thus, this control is considerably effective from the viewpoint of user friendliness.

The cooling-fan control unit 65 controls driving of the cooling fan 40. More specifically, the cooling-fan control unit 65 controls the number of rotations of a motor that drives the cooling fan 40 or the like.

In the present embodiment, the control device 60 is embodied as a computer device that includes a central processing unit (CPU), a read only memory (ROM), and a random access memory (RAM). Functions of the receiving unit 61, the electric-power control unit 62, the notification control unit 63, the image control unit 64, and the cooling-fan control unit 65 described above are implemented by executing, by the CPU, program instructions stored in the ROM or the like, but not limited thereto. For instance, there may alternatively be employed a configuration, in which at least a part of the functions of the receiving unit 61, the electric-power control unit 62, the notification control unit 63, the image control unit 64, and the cooling-fan control unit 65 is implemented by a purpose-built hardware circuit.

The program instructions to be executed by the control device 60 may be configured so as to be provided as being recorded in a computer-readable storage medium such as a compact disc-read-only memory (CD-ROM), a flexible disk (FD), a compact disc recordable (CD-R), or a digital versatile disk (DVD) in an installable or executable format. The program instructions to be executed by the control device 60 may be configured so as to be stored in a computer connected to a network such as the Internet and provided by downloading over the network. The program instructions to be executed by the control device 60 may be configured so as to be provided or distributed over a network such as the Internet.

Figure 10:
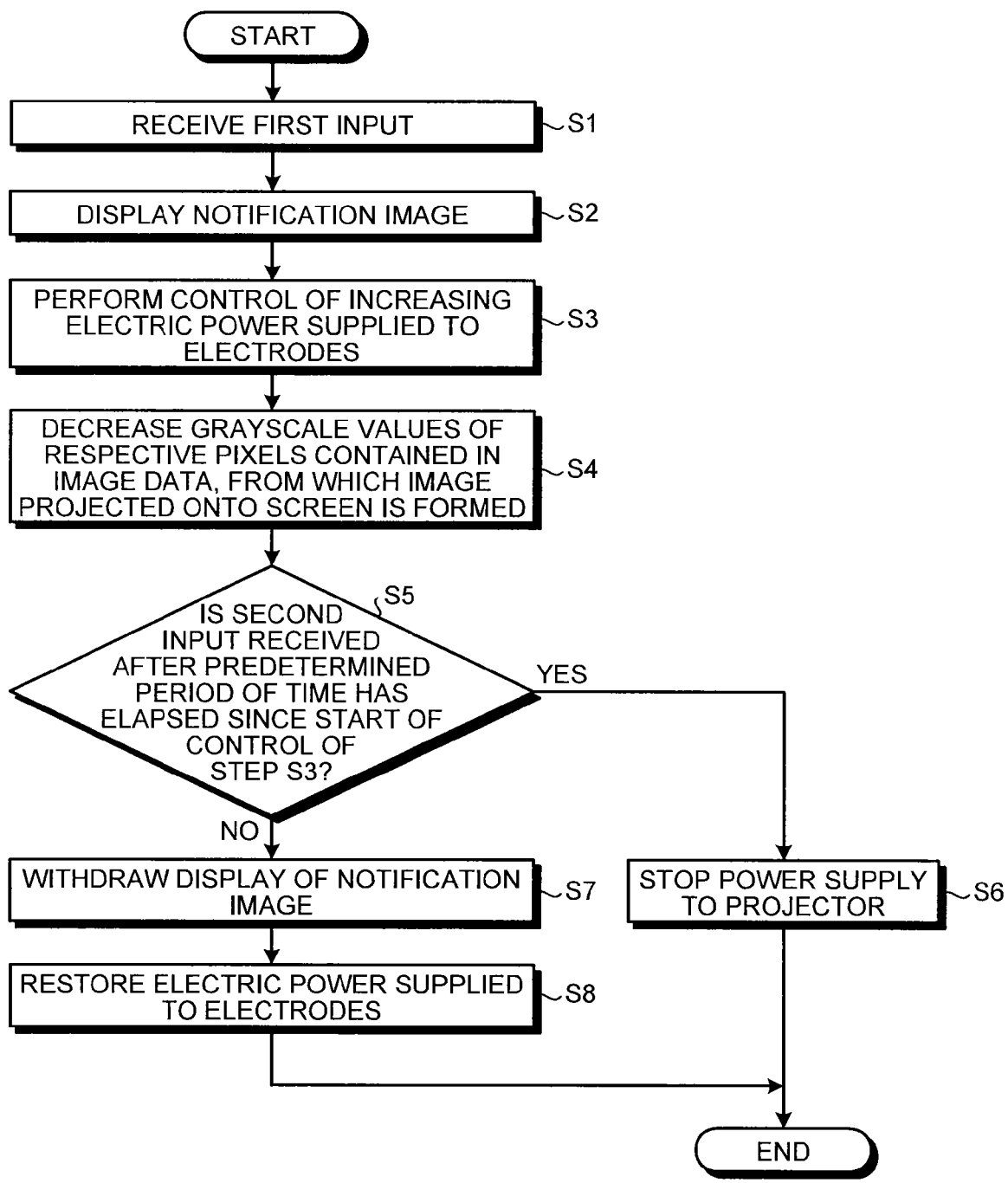
FIG. 10 is a flowchart illustrating an example of operations of the projector at power-off according to the embodiment.

An example of operations of the projector 1 at power-off is described below with reference to FIG. 10. FIG. 10 is a flowchart illustrating the example of operations of the projector 1 at power-off. A user performs the first push-down of the power button 50 first. In response thereto, the receiving unit 61 receives the first input (Step S1). Subsequently, the notification control unit 63 performs the control of displaying the notification image that notifies that power supply to the projector 1 is to be stopped (Step S2). Subsequently, the electric-power control unit 62 performs the control of increasing the electric power supplied to the electrodes 33 to a value higher than a current value (Step S3). Note that Step S2 and Step S3 may be performed in an arbitrary order; for example, Step S2 and Step S3 may be performed concurrently.

Subsequently, the image control unit 64 performs the control of decreasing grayscale values of respective pixels contained in image data, from which an image (in the present embodiment, the composite image described above) projected onto the screen 2 is formed (Step S4). Note that Step S3 and Step S4 may be performed in an arbitrary order; for example, Step S3 and Step S4 may be performed concurrently. Subsequently, after lapse of the predetermined period of time (preset period of time) since start of the control of Step S3 (the control of increasing the electric power supplied to the electrodes 33), the electric-power control unit 62 determines whether or not the second input is received by the receiving unit 61 (Step S5). When the electric-power control unit 62 determines that the second input is received after the predetermined period of time (preset period of time) has elapsed since start of the control of Step S3 (YES in Step S5), the electric-power control unit 62 performs the control of stopping power supply to the projector 1 (Step S6). From another point of view, the electric-power control unit 62 does not perform the control of stopping power supply to the projector 1 even when the power button 50 is pushed down before the predetermined period of time elapses since start of the control of Step S3. Accordingly, the electric-power control unit 62 can increase the electric power supplied to the electrodes 33 sufficiently. As a result, because the temperature difference between the electrodes 33 and the inner bulb unit 31 can be widened sufficiently, probability of occurrence of mercury bridging after power-off can be further lessened.

On the other hand, when the electric-power control unit 62 determines that the second input is not received after the predetermined period of time is elapsed since start of the control of Step S3 (NO in Step S5), the electric-power control unit 62 sends a notification to the notification control unit 63 rather than performing the control of stopping power supply to the projector 1. The notification tells that the second input is not received after the predetermined period of time has elapsed since start of the control of Step S3. It is determined "NO" in Step S5 when, for instance, a user does not push down the power button 50 even after the predetermined period of time has elapsed since start of the control of Step S3, or when the user pushes down a button other than the power button 50. Upon receiving this notification, the electric-power control unit 62 performs control of withdrawing display of the notification image (Step S7). Subsequently, the electric-power control unit 62 performs control of bringing the value of the electric power supplied to the electrodes 33 back to its original state (Step S8). More specifically, the electric-power control unit 62 performs control of bringing the value of the electric power supplied to the electrodes 33 back to a value immediately before start of the control of Step S3.

Figure 11:
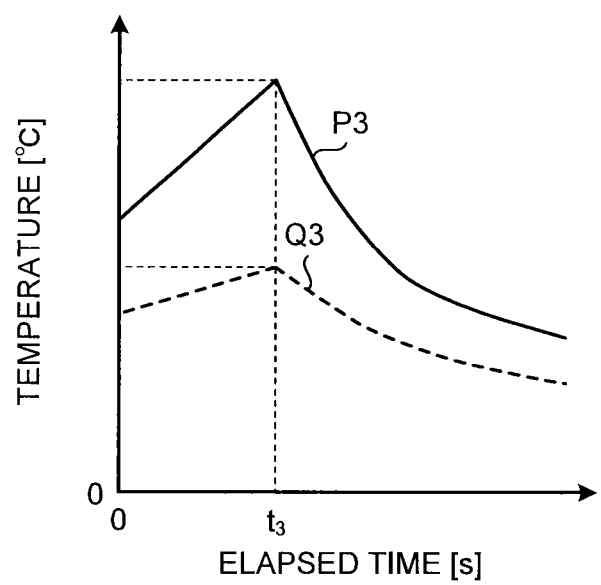
FIG. 11 is a diagram illustrating an example of changes in temperature over time of each of an inner bulb unit and electrodes of the projector according to the embodiment.

FIG. 11 is a diagram illustrating an example of changes in temperature over time of each of the inner bulb unit 31 and the electrodes 33 in a condition where after-cooling is not applied after powering off the projector 1. P3 in FIG. 11 designates changes in temperature over time of the electrodes 33. Q3 in FIG. 11 designates changes in temperature over time of the inner bulb unit 31.

Referring to the example illustrated in FIG. 11, the first push-down of the power button 50 is performed at time t=0 (s); in response thereto, the notification image is displayed, and the control of increasing the value of the electric power supplied to the electrodes 33 is performed. Accordingly, as illustrated in FIG. 11, the temperature difference between the electrodes 33 and the inner bulb unit 31 widens with time because, in contrast to the temperature of the electrodes 33 that rises sharply, the temperature of the inner bulb unit 31 rises slowly (gradually). The second push-down of the power button 50 is performed and the projector 1 is powered off after lapse of time $t_3$ (s) since the first push-down of the power button 50. Since then, the temperature of the electrodes 33 decreases at a rate higher than a rate, at which the temperature of the inner bulb unit 31 decreases. However, the temperature difference between the electrodes 33 and the inner bulb unit 31 at power-off (at the point in time where time $t_3$ (s) is elapsed since the first push-down of the power button 50) is wider than that of FIG. 6 and FIG. 7. Therefore, a state, in which the temperature of the electrodes 33 is higher than the temperature of the inner bulb unit 31, can be maintained for a long period of time even after power-off. As a result, probability of occurrence of mercury bridging can be lessened without applying after-cooling.

As described above, according to the present embodiment, occurrence of mercury bridging can be lessened even without applying after-cooling. This is achieved by, when the power-off input that triggers powering-off is received, performing the control of increasing the electric power supplied to the electrodes 33 before powering-off. (The power-off input is the first input, which refers to an input provided by the first push-down of the power button 50, in the present embodiment). Moreover, for instance, time required to increase the electric power supplied to the electrodes 33 to the predetermined target value (threshold value) (or equivalently, time required to increase the temperature of the electrodes 33 to a predetermined target value) before power-off is considerably shorter than time required until the temperature of the inner bulb unit 31 drops to the boiling point of the mercury 32 or lower. Therefore, the present embodiment allows bringing the projector to a complete stop earlier compared with the technique disclosed in Japanese Patent No. 4070420. Accordingly, the present embodiment offers an advantage that a projector capable of improving user's convenience can be provided.

Modifications

Modifications of the embodiment are described below. The modifications described below can be combined as appropriate. The modification(s) may be appropriately combined with the embodiment described above.

Modification 1

The light source of the projector 1 of the present embodiment is not limited to a high-pressure mercury-vapor lamp but can be any light source so long as the light source is of a type that causes a light-emitting material (e.g., mercury) to emit light by utilizing an electric discharge between a pair of electrodes, and can suffer from short circuit resulting from sticking of the light-emitting material to the electrodes when electric power supply to the electrodes is stopped.

Modification 2

In the embodiment described above, the electric-power control unit 62 does not perform the control of stopping power supply to the projector 1 even when the second input is received by the receiving unit 61 until the preset period of time is elapsed since the control of increasing the electric power supplied to the electrodes 33 was started in response to the first input received by the receiving unit 61. However, an employable configuration is not limited thereto. For instance, there may be employed a configuration in which the electric-power control unit 62 does not perform the control of stopping power supply to the projector 1 even when the second input is received by the receiving unit 61 until the electric power supplied to the electrodes 33 reaches a threshold value (predetermined target value) since the control of increasing the electric power supplied to the electrodes 33 was started in response to the first input received by the receiving unit 61.

Modification 3

In the embodiment described above, the electric-power control unit 62 performs the control of increasing the electric power supplied to the electrodes 33 when the first input is received by the receiving unit 61. However, an employable configuration not limited thereto. For instance, there may be employed the following configuration: when the first input is received by the receiving unit 61, the notification control unit 63 performs the control of displaying the notification image; thereafter, when the second input is received by the receiving unit 61, the electric-power control unit 62 starts the control of increasing the value of the electric power supplied to the electrodes 33; the electric-power control unit 62 performs the control of stopping power supply to the projector 1 when the value of the electric power supplied to the electrodes 33 reaches the threshold value or when the preset period of time has elapsed. In short, there may be employed a configuration, in which the second input, which refers to an input provided by the second or later push-down of the power button 50, corresponds to the "power-off input".

Modification 4

In the embodiment described above, when the first push-down of the power button 50 is performed, the notification image is displayed. When a user that views the notification image pushes down the power button 50 second time, the projector 1 is powered off. However, an employable configuration is not limited thereto. For instance, there may be employed a configuration in which, when the first push-down of the power button 50 is performed, the projector 1 is powered off without displaying the notification image. With this configuration, the electric-power control unit 62 performs the control of increasing the electric power supplied to the electrodes 33 when the first input, which refers to an input provided by the first push-down of the power button 50, is received by the receiving unit 61. When this configuration is employed, it is preferable that the electric-power control unit 62 does not perform the control of stopping power supply to the projector 1 until a preset period of time elapses or the value of the electric power supplied to the electrodes 33 reaches a threshold value (predetermined target value) since start of the control of increasing the electric power supplied to the electrodes 33.

In short, an image projection apparatus according to an aspect of the present invention preferably includes: a receiving unit that receives a power-off input (which may either the first input or the second input described above), which refers to an input that triggers stopping power supply to the image projection apparatus; and an electric-power control unit that, when the power-off input is received by the receiving unit, performs control of increasing the value of the electric power supplied to electrodes before stopping power supply to the image projection apparatus.

Modification 5

In the embodiment described above, for instance, the cooling-fan control unit 65 may perform control of increasing the number of rotations of the cooling fan 40 to a value higher than a current value when the first input is received by the receiving unit 61. With this control, the temperature of the electrode 33, to which the control of increasing the electric power supplied thereto is applied, increases, while the temperature of the inner bulb unit 31 further decreases because cooling power therefor is increased. Accordingly, it becomes possible to further widen the temperature difference between the electrodes 33 and the inner bulb unit 31 until the power is turned off in response to the second input. As a result, probability of occurrence of mercury bridging after power-off can be further lessened.

In Modification 3, for instance, the cooling-fan control unit 65 may perform the control of increasing the number of rotations of the cooling fan 40 to a value higher than a current value when the second input is received by the receiving unit 61. In Modification 4, for instance, the cooling-fan control unit 65 may perform the control of increasing the value of the number of rotations of the cooling fan 40 than a current value when the first input is received by the receiving unit 61. In short, there may be employed a configuration in which, when the power-off input is received by the receiving unit 61, the electric-power control unit 62 performs the control of increasing the electric power supplied to the electrodes 33, and the cooling-fan control unit 65 performs the control of increasing the value of the number of rotations of the cooling fan 40 than a current value.

According to the embodiments, user's convenience can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus comprising:
   a light source including a light-emitting material to emit light by an electric discharge between a pair of electrodes;
   an image generator to form an image by modulating intensity of the light emitted from the light source;
   a receiver to receive a power-off input that triggers stopping power supply to the image projection apparatus; and
   an electric-power controller to increase electric power supplied to the electrodes before stopping power supply to the image projection apparatus when the receiver receives the power-off input.

2. The image projection apparatus according to claim 1, wherein the light-emitting material includes mercury.

3. The image projection apparatus according to claim 1, wherein
   the power-off input is a first input provided by first push-down of a power button for designating whether to supply electric power to the image projection apparatus, and
   the electric-power controller stops power supply to the image projection apparatus after the receiver receives a second input provided by second or later push-down of the power button.

4. The image projection apparatus according to claim 3, further comprising a notification controller to display a notification image that notifies that power supply to the image projection apparatus is to be stopped when the receiver receives the first input.

5. The image projection apparatus according to claim 3, further comprising an image controller to decrease grayscale values of respective pixels contained in image data from which an image to be projected onto a projection surface is formed when the receiver receives the first input.

6. The image projection apparatus according to claim 3, wherein the electric-power controller is not to stop power supply to the image projection apparatus even when the receiver receives the second input until a predetermined period of time is elapsed since increasing the electric power supplied to the electrodes was started in response to the first input received by the receiver.

7. The image projection apparatus according to claim 3, wherein the electric-power controller is not to stop power supply to the image projection apparatus even when the receiver receives the second input until the electric power supplied to the electrodes reaches a threshold value since increasing the electric power supplied to the electrodes was started in response to the first input received by the receiver.

8. The image projection apparatus according to claim 1, further comprising
   a notification controller to display a notification image that notifies that power supply to the image projection apparatus is to be stopped when the receiver receives a first input provided by first push-down of a power button for designating whether to supply electric power to the image projection apparatus, wherein:
   the power-off input is a second input provided by second or later push-down of the power button, and
   the electric-power controller is to
      start increasing the electric power supplied to the electrodes when the receiver receives the second input, and
      stop power supply to the image projection apparatus after the electric power supplied to the electrodes has reached a threshold value or a predetermined period of time is elapsed since increasing the electric power supplied to the electrodes was started.

9. The image projection apparatus according to claim 1, further comprising:
   a cooling fan to cool the light source; and
   a cooling-fan controller to increase a number of rotations of the cooling fan to a value higher than a current value when the receiver receives the power-off input.

10. The image projection apparatus according to claim 1, wherein the electric-power controller is to maintain the electric power supplied to the electrodes at a threshold value when the electric power supplied to the electrodes has reached the threshold value.

11. The image projection apparatus according to claim 1, wherein the light source comprises a mercury-vapor lamp.

12. The method according to claim 11, wherein the increasing of the electric power supplied to the electrodes increases the electric power supplied to the electrodes of a mercury-vapor lamp.

13. A method for controlling an image projection apparatus that includes a light source to cause a light-emitting material to emit light by an electric discharge between a pair of electrodes, and an image generator to form an image by modulating intensity of the light emitted from the light source, the method comprising:
   receiving a power-off input that triggers stopping power supply to the image projection apparatus; and
   increasing electric power supplied to the electrodes before stopping power supply to the image projection apparatus when the power-off input is received.

14. A non-transitory computer-readable storage medium with an executable program stored thereon and executed by a computer of an image projection apparatus that includes a light source to cause a light-emitting material to emit light by an electric discharge between a pair of electrodes, and an image generator to form an image by modulating intensity of the light emitted from the light source, wherein the program instructs the computer to perform:
   receiving a power-off input that triggers stopping power supply to the image projection apparatus; and
   increasing electric power supplied to the electrodes before stopping power supply to the image projection apparatus when the power-off input is received.

15. The non-transitory computer-readable storage medium according to claim 14, wherein the increasing of the electric power supplied to the electrodes increases the electric power supplied to the electrodes of a mercury-vapor lamp.

* * * * *